(12) United States Patent
Kojima et al.

(10) Patent No.: US 8,815,464 B2
(45) Date of Patent: Aug. 26, 2014

(54) FUEL CELL

(75) Inventors: Hidetada Kojima, Wako (JP); Masaaki Sakano, Wako (JP); Yasuhiro Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 13/413,655

(22) Filed: Mar. 7, 2012

(65) Prior Publication Data

US 2012/0231362 A1    Sep. 13, 2012

(30) Foreign Application Priority Data

Mar. 9, 2011    (JP) ................................. 2011-051574

(51) Int. Cl.
*H01M 8/24*     (2006.01)
*H01M 8/10*     (2006.01)

(52) U.S. Cl.
CPC ............... *H01M 8/10* (2013.01); *Y02E 60/521* (2013.01); *H01M 8/24* (2013.01)
USPC ........... 429/458; 429/457; 429/452; 429/517; 429/518

(58) Field of Classification Search
None
See application file for complete search history.

(56) References Cited

U.S. PATENT DOCUMENTS

| | | | |
|---|---|---|---|
| 6,593,022 B1 * | 7/2003 | McLean .................... | 429/457 |
| 7,759,014 B2 | 7/2010 | Wakahoi et al. | |
| 2002/0168561 A1 * | 11/2002 | Boehm et al. ............. | 429/38 |
| 2003/0211376 A1 * | 11/2003 | Hatoh et al. .............. | 429/32 |
| 2007/0020504 A1 | 1/2007 | Sugita et al. | |
| 2009/0186253 A1 * | 7/2009 | Trabold et al. ............ | 429/34 |

FOREIGN PATENT DOCUMENTS

| | | |
|---|---|---|
| JP | 2001-266911 | 9/2001 |
| JP | 2003-229144 | 8/2003 |
| JP | 2011-018540 | 1/2011 |

\* cited by examiner

*Primary Examiner* — Milton I Cano
*Assistant Examiner* — Wojciech Haske
(74) *Attorney, Agent, or Firm* — Mori & Ward, LLP

(57) ABSTRACT

A fuel cell includes a membrane electrode assembly and a metal separator. The metal separator is stacked with the membrane electrode assembly. A reactant gas passage is provided between the membrane electrode assembly and the metal separator to supply a reactant gas along an electrode surface. The metal separator includes a reactant gas communication hole to communicate with the reactant gas passage. The metal separator further includes a plurality of groove groups each having a plurality of grooves press-formed to allow the reactant gas communication hole to communicate with the reactant gas passage. The grooves adjacent to each other are spaced apart by a first distance. The groove groups adjacent to each other are spaced apart by a second distance larger than the first distance.

10 Claims, 13 Drawing Sheets

FUEL CELL

CROSS-REFERENCE TO RELATED APPLICATIONS

The present application claims priority under 35 U.S.C. §119 to Japanese Patent Application No. 2011-051574, filed Mar. 9, 2011, entitled "Fuel Cell." The contents of this application are incorporated herein by reference in their entirety.

BACKGROUND OF THE INVENTION

1. Field of the Invention

The present invention relates to a fuel cell.

2. Discussion of the Background

For example, a solid polymer electrolyte fuel cell includes a unit cell, in which an electrolyte membrane-electrode assembly (MEA) is sandwiched between a pair of separators, the electrolyte membrane-electrode assembly having a polymer electrolyte membrane formed of a polymer ion exchange membrane, and the anode-side and cathode-side electrodes that are disposed on the both sides of the polymer electrolyte membrane. In this type of fuel cell, normally, a fuel cell stack, in which a predetermined number of unit cells are stacked together, is used as an in-vehicle fuel cell stack or the like.

In the above-described fuel cell, a fuel gas passage (reactant gas passage) for passing a fuel gas, which faces the anode-side electrode is formed in the surface of one separator, while an oxidant gas passage (reactant gas passage) for passing an oxidant gas, which faces the cathode-side electrode is formed in the surface of the other separator. In addition, a cooling medium passage for passing a cooling medium is provided between the separators along the surface direction of the separators.

Furthermore, in many cases, this type of fuel cell constitutes what is called an internal manifold type fuel cell that includes therein a fuel gas inlet communication hole (reactant gas communication hole) and a fuel gas outlet communication hole (reactant gas communication hole) that allow a fuel gas to flow in the stacking direction of the unit cells, an oxidant gas inlet communication hole (reactant gas communication hole) and an oxidant gas outlet communication hole (reactant gas communication hole) that allow an oxidant gas to flow, and a cooling medium inlet communication hole and a cooling medium outlet communication hole that allow a cooling medium to flow.

In this case, the reactant gas passage and the reactant gas communication hole communicate with each other via a connecting passage having parallel grooves in order to pass the reactant gas smoothly and uniformly. However, there is a problem in that when the separators and the membrane electrode assembly are tightened and secured together by interposing a sealing member therebetween, the sealing member enters the connecting passage, and thus a desired sealing function may not be maintained, and also, the reactant gas does not flow smoothly.

For example, in the solid polymer electrolyte fuel cell stack disclosed in Japanese Unexamined Patent Application Publication No. 2001-266911, a reactant gas passage which meanders on the surface of a separator 1, for example, an oxidant gas passage 2 is formed as illustrated in FIG. 13. The oxidant gas passage 2 communicates with an oxidant gas supply through hole 3 and an oxidant gas discharge through hole 4 that extend through a peripheral portion of the separator 1 in the stacking direction. Packing 5 is disposed in the separator 1 to allow the through holes 3, 4 to communicate with the oxidant gas passage 2 on the surface of the separator 1, while sealing other through holes from the through holes 3, 4 and the oxidant gas passage 2.

In the connecting passages 6a, 6b that respectively allow the through holes 3, 4 to communicate with the oxidant gas passage 2, SUS plates 7 as sealing members are disposed so as to cover the connecting passages 6a and 6b, respectively. The SUS (stainless steel) plates 7 are each formed in a rectangular shape, and are provided with ear portions 7a and 7b at two locations, respectively. The ear portions 7a, 7b are fitted into respective steped portions 8 that are formed in the separator 1.

In this manner, Japanese Unexamined Patent Application Publication No. 2001-266911 claims that a desired sealing function may be secured and may prevent an increase in the pressure loss of the reactant gas because the SUS plates 7 cover the connecting passages 6a, 6b, and thus a polymer electrolyte membrane (not shown) and the packing 5 do not fall into the oxidant gas passage 2.

SUMMARY OF THE INVENTION

According to one aspect of the present invention, a fuel cell includes a membrane electrode assembly and a metal separator. The membrane electrode assembly has an electrolyte membrane and a pair of electrodes disposed on both sides of the electrolyte membrane. The metal separator is stacked with the membrane electrode assembly. A reactant gas passage is provided between the membrane electrode assembly and the metal separator to supply a reactant gas along an electrode surface. The metal separator includes a reactant gas communication hole to communicate with the reactant gas passage. The reactant gas communication hole has a through hole in the stacking direction. The metal separator further includes a plurality of groove groups each having a plurality of grooves press-formed to allow the reactant gas communication hole to communicate with the reactant gas passage. The grooves adjacent to each other are spaced apart by a first distance. The groove groups adjacent to each other are spaced apart by a second distance larger than the first distance.

According to another aspect of the present invention, a fuel cell includes a plurality of unit cells. The plurality of unit cells each includes a membrane electrode assembly and a metal separator. The membrane electrode assembly has an electrolyte membrane and a pair of electrodes disposed on both sides of the electrolyte membrane. The metal separator is stacked with the membrane electrode assembly. The reactant gas passage is provided between the membrane electrode assembly and the metal separator to supply a reactant gas along an electrode surface. The metal separator includes a reactant gas communication hole to communicate with the reactant gas passage. The reactant gas communication hole has a through hole in the stacking direction. The metal separator further includes a plurality of grooves each press-formed to allow the reactant gas communication hole to communicate with the reactant gas passage. The grooves provided in a first unit cell are offset not to overlap with the grooves provided in a second unit cell when viewed in the stacking direction. The first unit cell is adjacent to the second unit cell.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
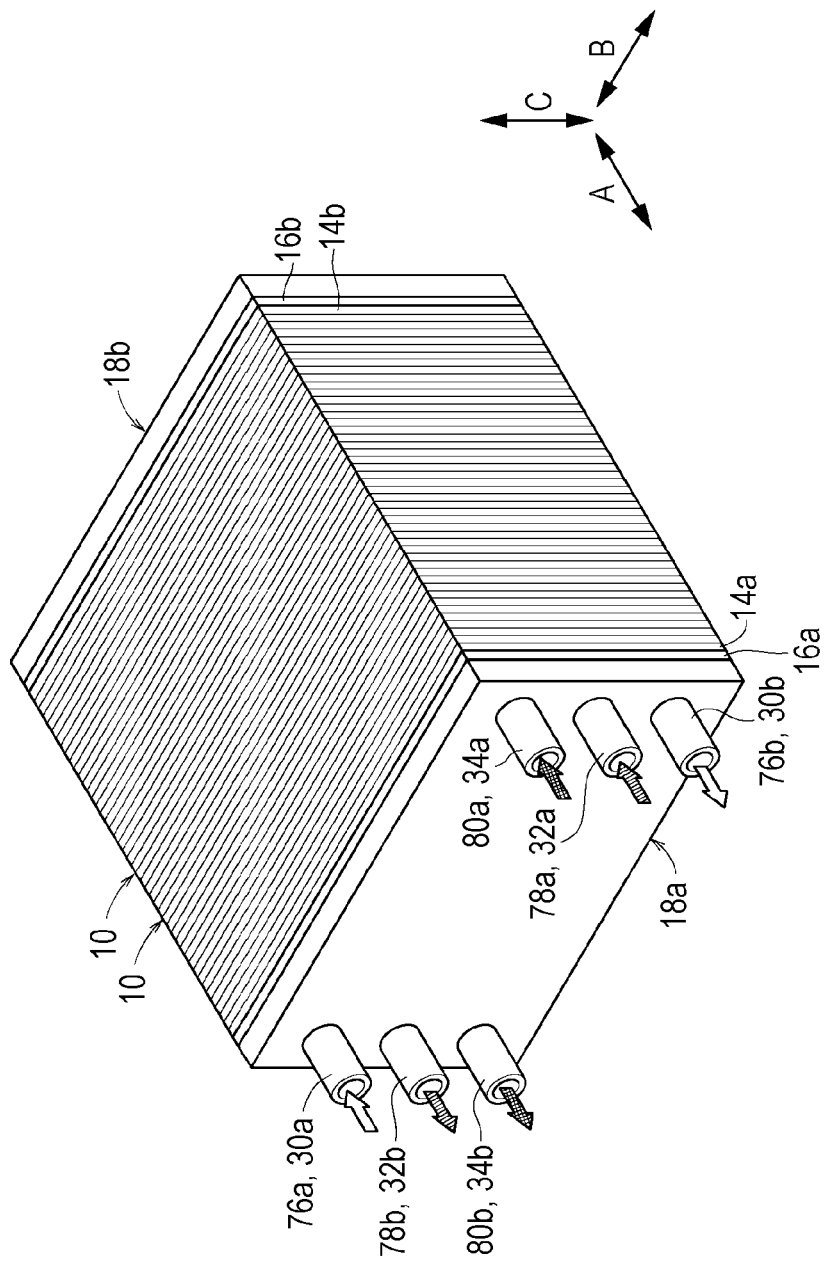
FIG. 1 is an illustrative perspective view of a fuel cell stack including laminated fuel cells according to a first embodiment of the present disclosure.

The embodiments will now be described with reference to the accompanying drawings, wherein like reference numerals designate corresponding or identical elements throughout the various drawings.

As illustrated in FIG. 1, a plurality of fuel cells 10 according to a first embodiment of the present disclosure are stacked in the direction of the arrow A so as to constitute a fuel cell stack 12. The two ends of the fuel cell 10 are respectively provided with terminal plates 14a and 14b, insulating plates 16a and 16b, and end plates 18a and 18b in the stacking direction. The end plates 18a, 18b are tightened by a tie rod (not shown) in the stacking direction, however, instead, the fuel cell 10 may be housed in a casing (not shown) having the end plates 18a, 18b as the end plates.

Figure 2:
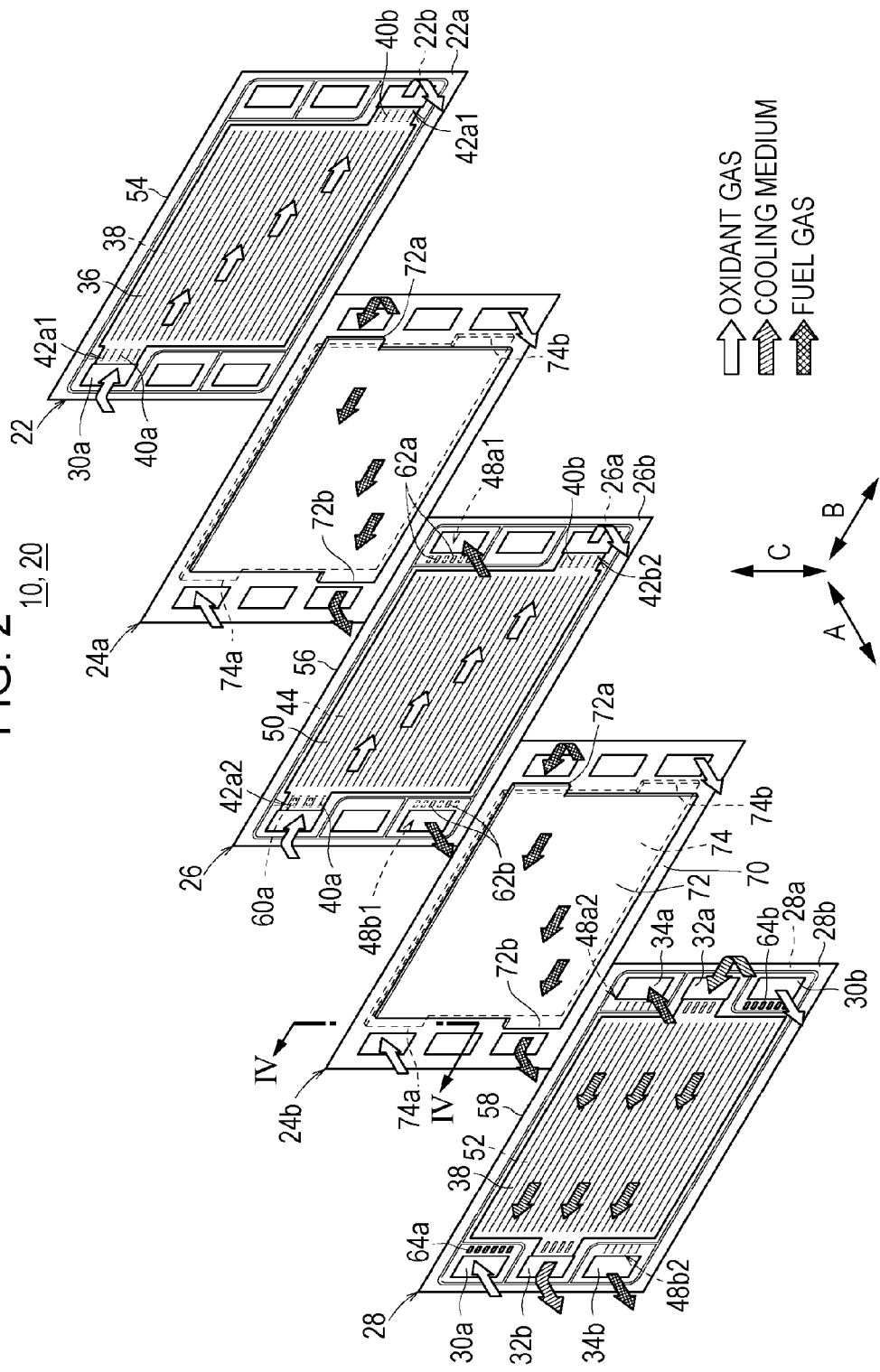
FIG. 2 is an illustrative perspective view of the main part of a power generation unit which constitutes the fuel cell.

As illustrated in FIG. 2, the fuel cell 10 includes a plurality of power generation units 20, which are stacked on top of one another in the horizontal direction (the direction of an arrow A) (or the vertical direction). The power generation unit 20 includes a first metal separator 22, a first electrolyte membrane-electrode assembly (MEA) 24a, a second metal separator 26, a second electrolyte membrane-electrode assembly (MEA) 24b, and a third metal separator 28. The first electrolyte membrane-electrode assembly 24a, and the second electrolyte membrane-electrode assembly 24b each constitute a unit cell.

One end of the power generation unit 20 in the direction of an arrow B (the horizontal direction in FIG. 2) is provided with an oxidant gas inlet communication hole 30a for supplying an oxidant gas, for example, an oxygen containing gas, a cooling medium outlet communication hole 32b for discharging a cooling medium, and a fuel gas outlet communication hole 34b for discharging a fuel gas, for example, a hydrogen containing gas that communicate with each other in the direction of the arrow A, and are arranged and provided in the direction of an arrow C (the vertical direction).

The other end of the power generation unit 20 in the direction of the arrow B is provided with a fuel gas inlet communication hole 34a for supplying a fuel gas, a cooling medium inlet communication hole 32a for supplying a cooling medium, and an oxidant gas outlet communication hole 30b for discharging an oxidant gas that communicate with each other in the direction of the arrow A, and are arranged and provided in the direction of the arrow C.

Figure 3:
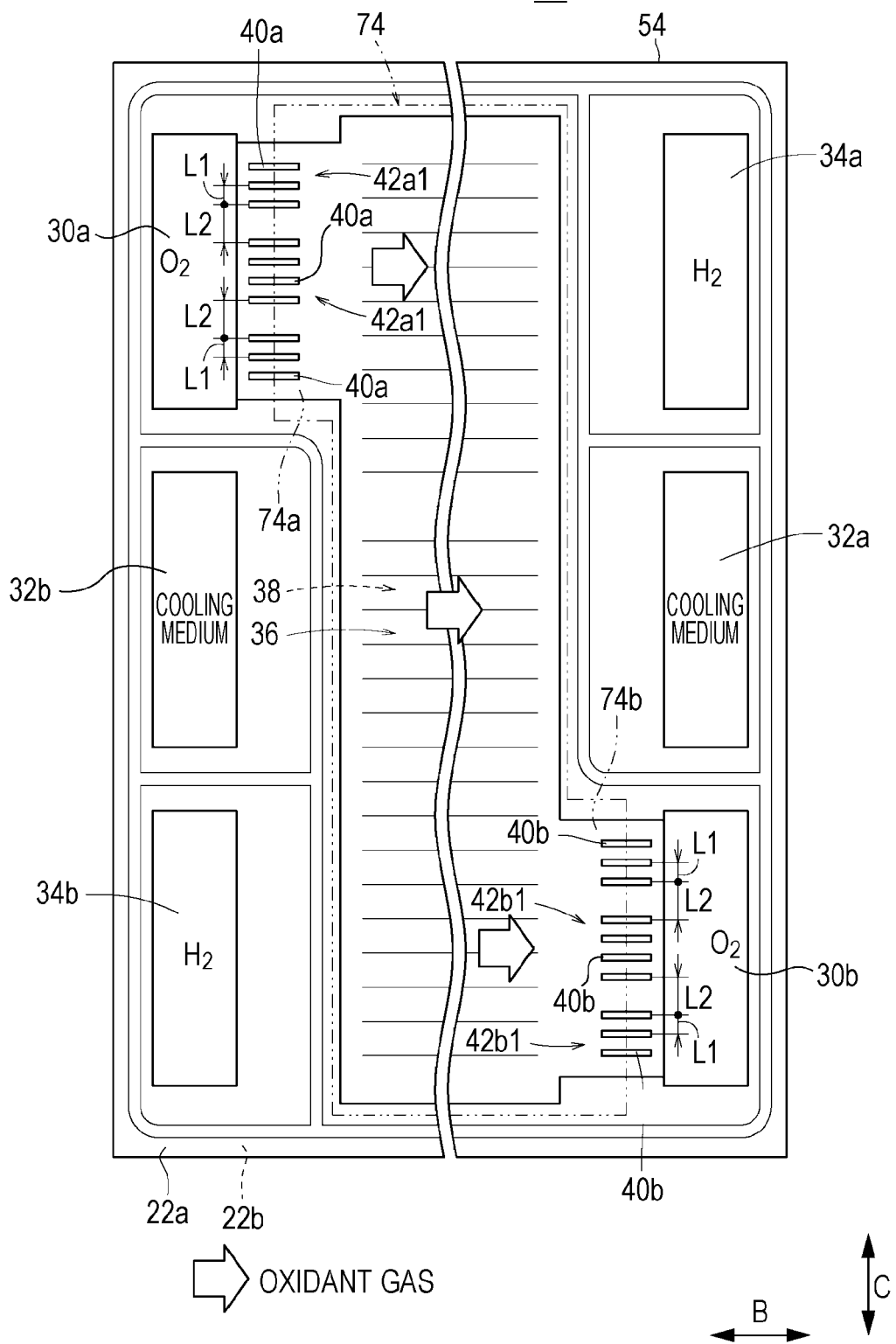
FIG. 3 is an illustrative front view of a first metal separator which constitutes the fuel cell.

As illustrated in FIGS. 2 and 3, a surface 22a of the first metal separator 22 that faces the first electrolyte membrane-electrode assembly 24a is provided with, for example, a first oxidant gas passage (reactant gas passage) 36 that linearly extends in the direction of the arrow B. The first oxidant gas passage 36 includes a plurality of grooves that are provided by press forming the first metal separator 22, which is a thin metal plate, into a corrugated form. A surface 22b on the opposite side of the first metal separator 22 is provided with part of the cooling medium passage 38 that has the same shape as the back surface of the first oxidant gas passage 36.

Figure 4:
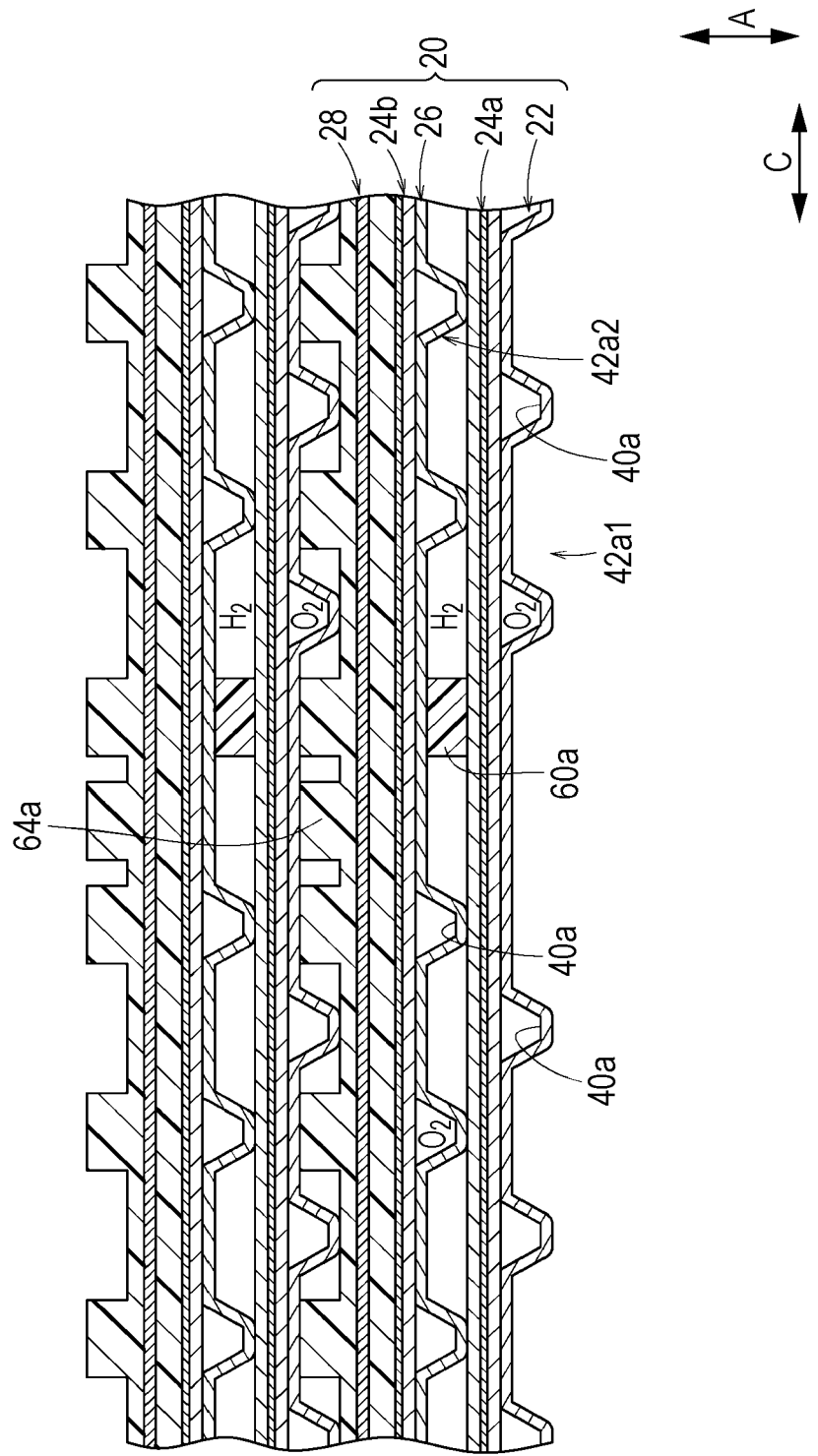
FIG. 4 is an illustrative cross-sectional view of the fuel cell along a line IV-IV in FIG. 2.

The first oxidant gas passage 36, the oxidant gas inlet communication hole 30a, and the oxidant gas outlet communication hole 30b communicate with each other via a plurality of grooves 40a, 40b. As illustrated in FIGS. 3 and 4, the plurality of grooves 40a, 40b are each arranged in the direction of the arrow C, and are integrally press-formed in the first metal separator 22.

As illustrated in FIG. 3, the plurality of grooves 40a form a plurality of groove groups 42a1, in each of which adjacent grooves 40a are spaced apart by a first distance L1. Adjacent groove groups 42a1 are spaced apart by a second distance L2 which is larger than the first distance L1 (L2>L1).

The plurality of grooves 40b form a plurality of groove groups 42b1, in each of which adjacent grooves 40b are spaced apart by the first distance L1. Adjacent groove groups 42b1 are spaced apart by the second distance L2 which is larger than the first distance L1.

Figure 5:
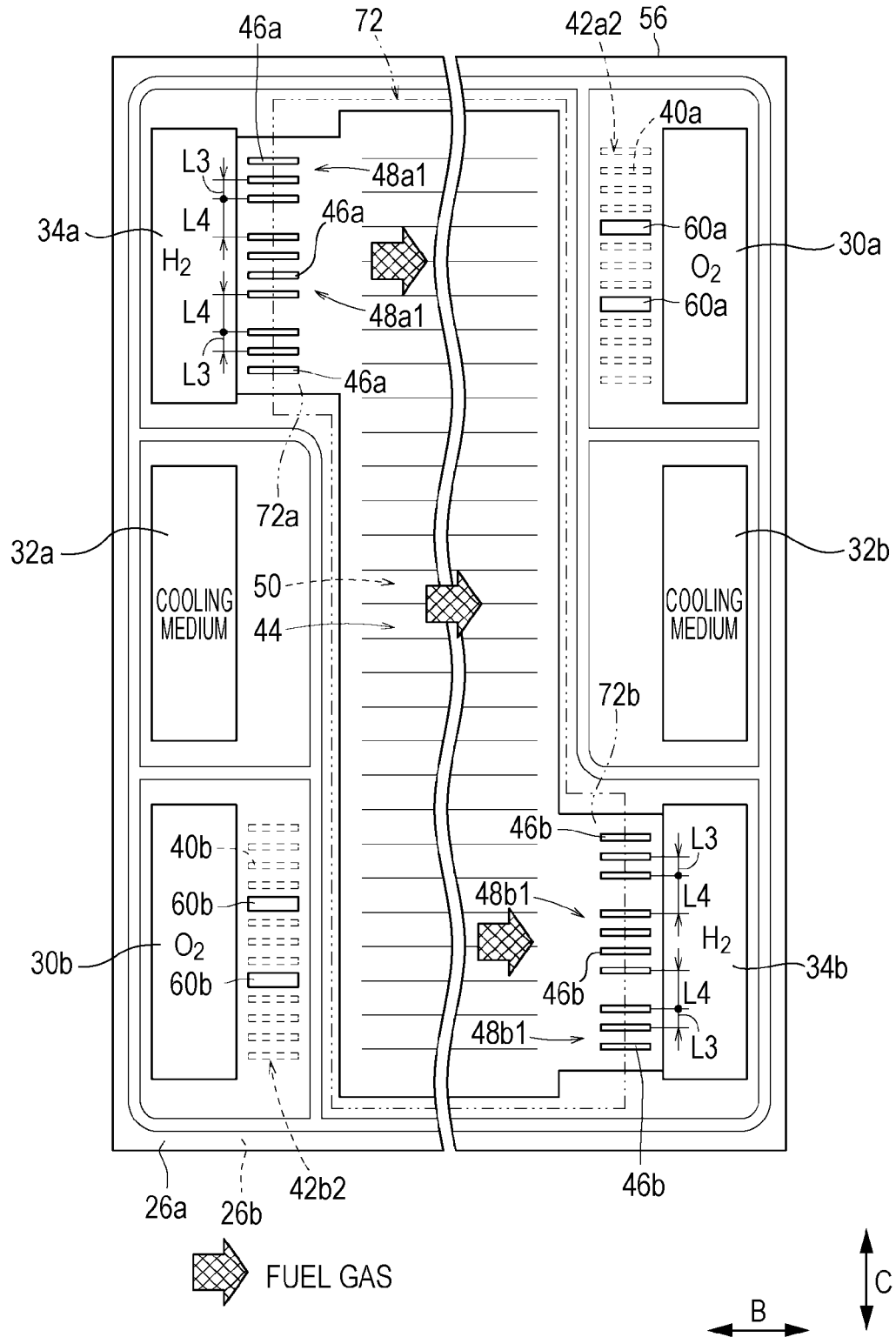
FIG. 5 is an illustrative front view from one side of a second metal separator which constitutes the fuel cell.

As illustrated in FIGS. 2 and 5, a surface 26a of the second metal separator 26 that faces the first electrolyte membrane-electrode assembly 24a is provided with a first fuel gas passage (reactant gas passage) 44 that extends in the direction of the arrow B, and communicates with the fuel gas inlet communication hole 34a and the fuel gas outlet communication hole 34b.

The first fuel gas passage gas passage 44 includes a plurality of grooves that are provided by press forming the second metal separator 26, which is a thin metal plate, into a corrugated form. The first fuel gas passage 44, the fuel gas inlet communication hole 34a, and the fuel gas outlet communication hole 34b communicate with each other via a plurality of grooves 46a, 46b. The plurality of grooves 46a, 46b are each arranged in the direction of the arrow C, and are integrally press-formed in the second metal separator 26.

The plurality of grooves 46a form a plurality of groove groups 48a1, in each of which adjacent grooves 46a are spaced apart by a first distance L3. Adjacent groove groups 48a1 are spaced apart by a second distance L4 which is larger than the first distance L1 (L4>L3).

The plurality of grooves 46b form a plurality of groove groups 48b1, in each of which adjacent grooves 46b are spaced apart by the first distance L3. Adjacent groove groups 48b1 are spaced apart by the second distance L4 which is larger than the first distance L3.

Figure 6:
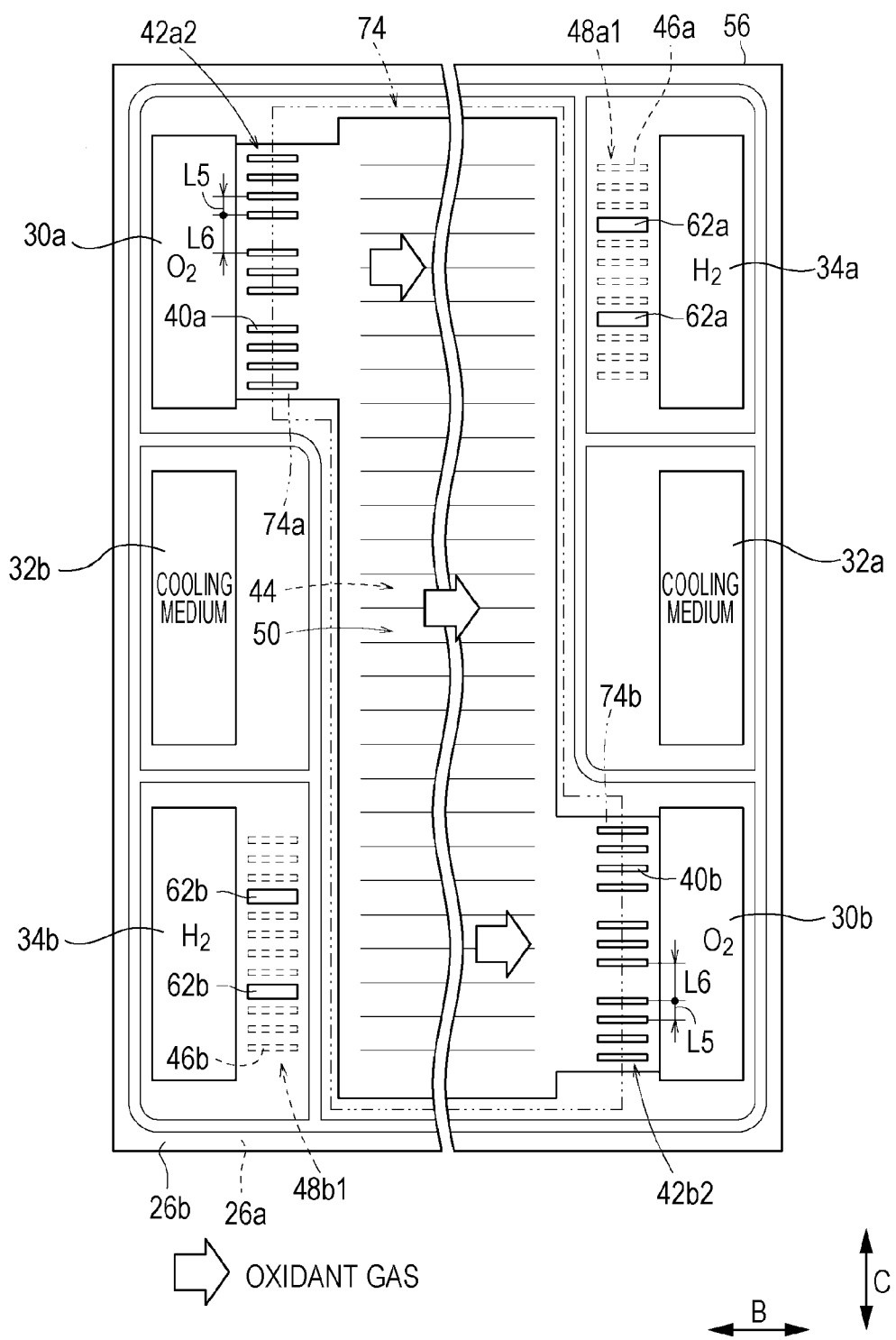
FIG. 6 is an illustrative front view from the other side of a second metal separator which constitutes the fuel cell.

As illustrated in FIG. 6, a surface 26b of the second metal separator 26 that faces the second electrolyte membrane-electrode assembly 24b is provided with a second oxidant gas passage (reactant gas passage) 50 that communicates with the oxidant gas inlet communication hole 30a and the oxidant gas outlet communication hole 30b. The second oxidant gas passage 50 has the same shape as the back surface of the first fuel gas passage 44, and includes a plurality of grooves. The second oxidant gas passage 50, the oxidant gas inlet communication hole 30a, and the oxidant gas outlet communication hole 30b communicate with each other via a plurality of grooves 40a, 40b.

As illustrated in FIG. 6, the plurality of grooves 40a form a plurality of groove groups 42a2, in each of which adjacent grooves 40a are spaced apart by a first distance L5. Adjacent groove groups 42a2 are spaced apart by a second distance L6 which is larger than the first distance L5 (L6>L5). As illustrated in FIG. 3, the groove groups 42a1 provided in the first metal separator 22 include two groups of three grooves 40a at the top and at the bottom, and a group of four grooves 40a in the center.

The plurality of groove groups 42a2 of the second metal separator 26 illustrated in FIG. 6 include two groups of four grooves 40a at the top and at the bottom, and a group of three grooves 40a in the center. Respective grooves 40a that constitute adjacent unit cells are disposed with an offset so as to not overlap when viewed in the stacking direction (see FIG. 4).

As illustrated in FIG. 6, the plurality of grooves 40b form a plurality of groove groups 42b2, in each of which adjacent grooves 40b are spaced apart by the first distance L5. Adjacent groove groups 42b2 are spaced apart by the second distance L6 which is larger than the first distance L5.

Figure 7:
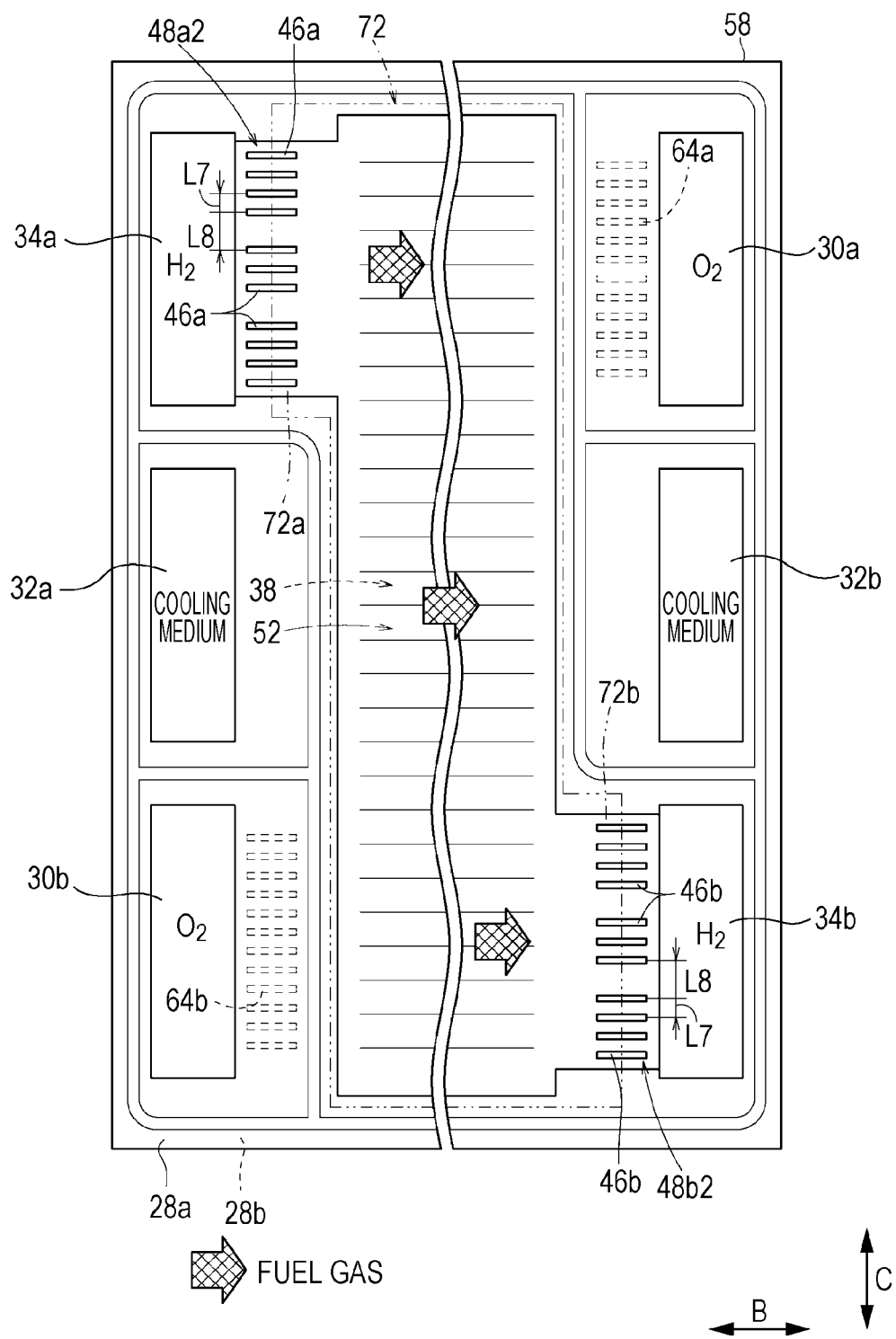
FIG. 7 is an illustrative front view of a third metal separator which constitutes the fuel cell.

As illustrated in FIG. 7, a surface 28a of the third metal separator 28 that faces the second electrolyte membrane-electrode assembly 24b is provided with a second fuel gas passage (reactant gas passage) 52 that communicates with the fuel gas inlet communication hole 34a and the fuel gas outlet communication hole 34b. The second fuel gas passage 52, the fuel gas inlet communication hole 34a, and the fuel gas outlet communication hole 34b communicate with each other via a plurality of grooves 46a, 46b. The plurality of grooves 46a constitute a plurality of groove groups 48a2, in each of which adjacent grooves 46a are spaced apart by a first distance L7. Adjacent groove groups 48a2 are spaced apart by a second distance L8 which is larger than the first distance L7 (L8>L7).

As illustrated in FIGS. 5 and 7, the groove groups 48a1 include two groups of three grooves 46a at the top and at the bottom, and a group of four grooves 46a in the center, while the groove groups 48a2 include two groups of four grooves 46a at the top and at the bottom, and a group of three grooves 46a in the center. The grooves 46a of the groove groups 48a1, and the grooves 46a of the groove groups 48a2 are disposed with an offset so as to not overlap when viewed in the stacking direction.

As illustrated in FIG. 7, the plurality of grooves 46b similarly constitute a plurality of groove groups 48b2 which include two groups of four grooves 46b at the top and at the bottom, and a group of three grooves 46b in the center. The groove groups 48b1 and 48b2 are set to have the same positional relationship as that between the above-described groove groups 48a1 and 48a2.

As illustrated in FIG. 2, the surfaces 22a, 22b of the first metal separator 22 are separately or integrally provided with a first sealing member 54 which surrounds the outer peripheral edge of the first metal separator 22. The surfaces 26a, 26b of the second metal separator 26 are separately or integrally provided with a second sealing member 56 which surrounds the outer peripheral edge of the second metal separator 26. The surfaces 28a, 28b of the third metal separator 28 are separately or integrally provided with a third sealing member 58 which surrounds the outer peripheral edge of the third metal separator 28.

As illustrated in FIGS. 4 and 5, the surface (26a) of the second metal separator 26 on the opposite side to the surface of the second metal separator 26 on which the groove groups 42a2 are formed is provided with two receiving members 60a that are each located between adjacent groove groups 42a2. The surface (26a) of the second metal separator 26 on the opposite side to the surface of the second metal separator 26 on which the groove groups 42b2 are formed is provided with two receiving members 60b that are each located between adjacent groove groups 42b2. The receiving members 60a, 60b are integrally molded with the second sealing member 56, however, they may be formed separately from the second sealing member 56.

As illustrated in FIG. 6, the surface (26b) of the second metal separator 26 on the opposite side to the surface of the second metal separator 26 on which the groove groups 48a1 are formed is provided with two receiving members 62a that are each located between adjacent groove groups 48a1. The surface (26b) of the second metal separator 26 on the opposite side to the surface of the second metal separator 26 on which the groove groups 48b1 are formed is provided with two receiving members 62b that are each located between adjacent groove groups 48b1. The receiving members 62a, 62b are integrally molded with the second sealing member 56, however, may be formed separately from the second sealing member 56.

As illustrated in FIGS. 2 and 7, the surface 28b of the third metal separator 28 is provided with a plurality of receiving members 64a, 64b serving as back support members between the grooves 40a and 40b of the first metal separator 22.

As illustrated in FIG. 2, the first electrolyte membrane-electrode assembly 24a and the second electrolyte membrane-electrode assembly 24b each include, for example, a solid polymer electrolyte membrane 70 which is a thin perfluoro sulfonic acid membrane impregnated with water, and an anode-side electrode 72 and a cathode-side electrode 74 between which the solid polymer electrolyte membrane 70 is sandwiched. The outer peripheral edge of the solid polymer electrolyte membrane 70 projects outwardly from the outer peripheral edge of the anode-side electrode 72 and the cathode-side electrode 74.

The anode-side electrode 72 and the cathode-side electrode 74 each have a gas diffusion layer which is formed of carbon paper or the like, and an electrode catalyst layer which is formed by uniformly coating the surface of the gas diffusion layer with porous carbon particles which carry platinum alloy on the surfaces thereof. The electrode catalyst layer is formed on both sides of the solid polymer electrolyte membrane 70.

The cathode-side electrode 74 includes projecting ends 74a, 74b that project toward the grooves 40a, 40b, respectively, (in the outward direction of the arrow B) of the first metal separator 22 in the longitudinal direction of the cathode-side electrode 74. As illustrated in FIG. 5, the anode-side electrode 72 has projecting ends 72a, 72b that project toward the grooves 46a, 46b, respectively, of the second metal separator 26 in the longitudinal direction of the anode-side electrode 72.

As illustrated in FIG. 1, the end plate 18a is provided with an oxidant gas inlet manifold 76a, a cooling medium outlet manifold 78b, and a fuel gas outlet manifold 80b that communicate with the oxidant gas inlet communication hole 30a, the cooling medium outlet communication hole 32b and the fuel gas outlet communication hole 34b, and a fuel gas inlet manifold 80a, a cooling medium inlet manifold 78a, and an oxidant gas outlet manifold 76b that communicate with the fuel gas inlet communication hole 34a, the cooling medium inlet communication hole 32a, and the oxidant gas outlet communication hole 30b.

The operation of the fuel cell 10 configured in this manner is described below.

First, as illustrated in FIG. 1, a fuel gas such as a hydrogen containing gas is supplied from the fuel gas inlet manifold 80a to the fuel gas inlet communication hole 34a, while an oxidant gas such as an oxygen containing gas is supplied from the oxidant gas inlet manifold 76a to the oxidant gas inlet communication hole 30a. In addition, cooling medium such as pure water, ethylene glycol, or oil is supplied from the cooling medium inlet manifold 78a to the cooling medium inlet communication hole 32a.

Thus, as illustrated in FIG. 2, the fuel gas is introduced from the fuel gas inlet communication hole 34a into the first fuel gas passage 44 of the second metal separator 26, and the second fuel gas passage 52 of the third metal separator 28. As illustrated in FIG. 5, the fuel gas introduced into the first fuel gas passage 44 of the second metal separator 26 is supplied to the anode-side electrode 72 that constitutes the first electrolyte membrane-electrode assembly 24a while moving in the direction of the arrow B.

On the other hand, as illustrated in FIG. 7, the fuel gas introduced into the second fuel gas passage 52 of the third metal separator 28 is supplied to the anode-side electrode 72 that constitutes the second electrolyte membrane-electrode assembly 24b while moving in the direction of the arrow B.

In addition, the oxidant gas is introduced from the oxidant gas inlet communication hole 30a into the first oxidant gas passage 36 of the first metal separator 22, and the second oxidant gas passage 50 of the second metal separator 26. As illustrated in FIG. 3, the oxidant gas introduced into the first oxidant gas passage 36 of the first metal separator 22 is supplied to the cathode-side electrode 74 that constitutes the first electrolyte membrane-electrode assembly 24a while moving in the direction of the arrow B.

On the other hand, as illustrated in FIG. 6, the oxidant gas introduced into the second oxidant gas passage 50 of the second metal separator 26 is supplied to the cathode-side electrode 74 that constitutes the second electrolyte membrane-electrode assembly 24b while moving in the direction of the arrow B.

Consequently, in the first electrolyte membrane-electrode assembly 24a and the second electrolyte membrane-electrode assembly 24b, the oxidant gas supplied to the respective cathode-side electrodes 74 and the fuel gas supplied to the respective anode-side electrodes 72 are consumed by an electrochemical reaction in respective electrode catalyst layers, and thus electric power is generated.

Next, the fuel gas that has been supplied to the respective anode-side electrodes 72 and consumed is discharged along the fuel gas outlet communication hole 34b in the direction of the arrow A. Similarly, the oxidant gas that has been supplied to the respective cathode-side electrodes 74 and consumed is discharged along the oxidant gas outlet communication hole 30b in the direction of the arrow A.

The cooling medium supplied to the cooling medium inlet communication hole 32a is introduced into the cooling medium passage 38 between the first metal separator 22 and the third metal separator 28, and then is circulated in the direction of the arrow B. The cooling medium, after cooling the first electrolyte membrane-electrode assembly 24a and the second electrolyte membrane-electrode assembly 24b, is discharged from the cooling medium outlet communication hole 32b.

In this case, in the first embodiment, as illustrated in FIG. 3, a plurality of grooves 40a that communicate with the oxidant gas inlet communication hole 30a and the first oxidant gas passage 36 are provided. The plurality of grooves 40a form a plurality of groove groups 42a1, in each of which adjacent grooves 40a are spaced apart by the first distance L1, while adjacent groove groups 42a1 are spaced apart by the second distance L2 which is larger than the first distance L1.

That is to say, the groove groups 42a1 are provided at an equal pitch by thinning out an arbitrary groove 40a. Consequently, the flow rate distribution and the pressure loss of the oxidant gas within the surface 22a of the first metal separator 22 may be adjusted, and it may become possible to prevent reduction of the power generation performance due to non-uniformly distributed accumulated water.

Furthermore, the surface 22b which is the back surface of the first metal separator 22 is provided with the receiving members 64a formed in the third metal separator 28, that are each located between adjacent groove groups 48a1 (see FIG. 4). Consequently, seal line pressure may be maintained and the first electrolyte membrane-electrode assembly 24a may be securely prevented from damage.

In addition, the second metal separator 26 is provided with groove groups 42a2 that are each consisting of a plurality of grooves 40a. The respective grooves 40a of the groove groups 42a1 and 42a2 are disposed with an offset so as to not overlap when viewed in the stacking direction. Accordingly, sealing surface pressure may be properly secured with an economical and simple configuration.

Figure 8:
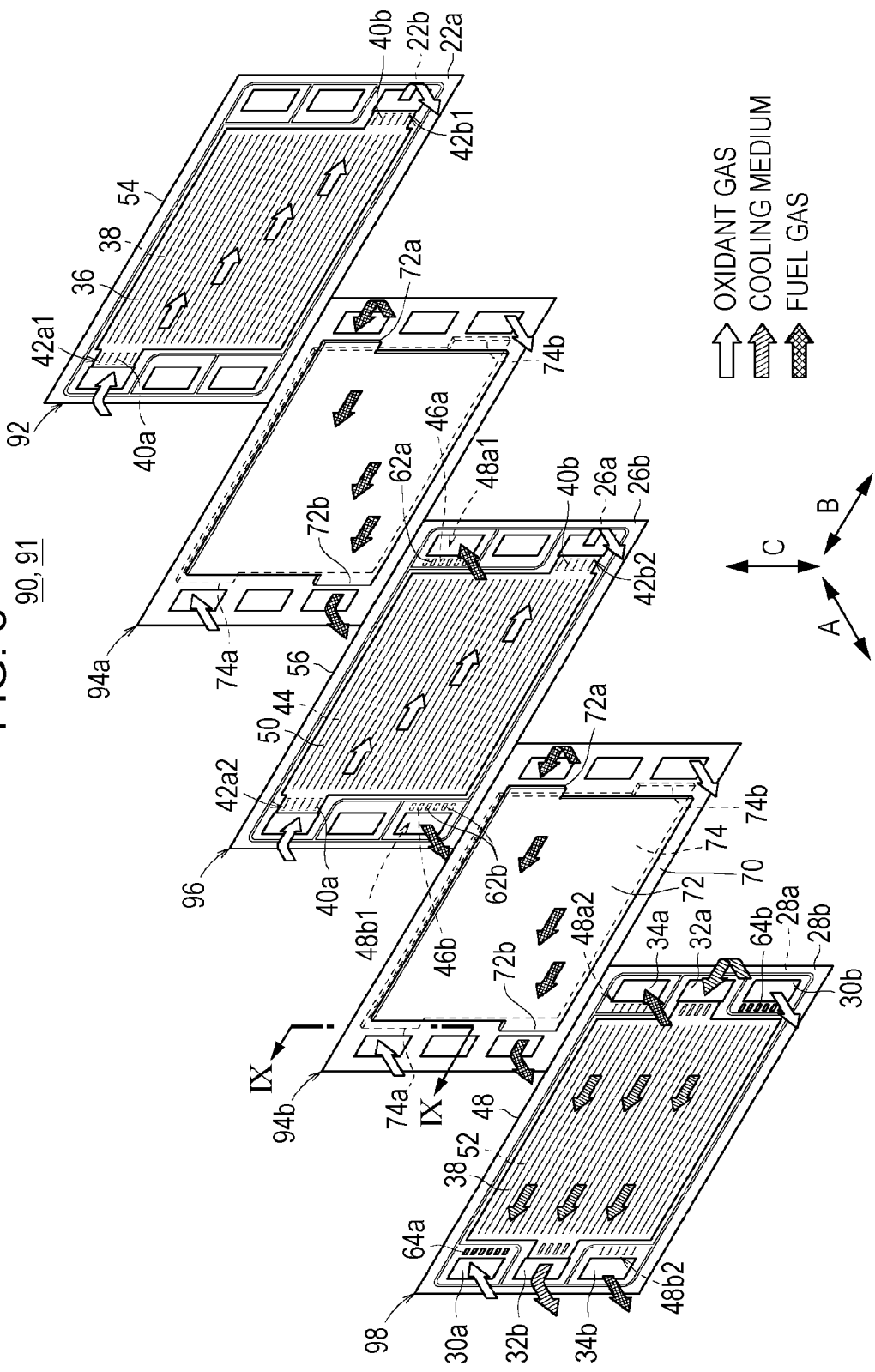
FIG. 8 is an illustrative exploded perspective view of the main part of a fuel cell according to a second embodiment.

FIG. 8 is an illustrative exploded perspective view of the main part of a fuel cell 90 according to a second embodiment.

The same components as those of the fuel cell 10 according to the first embodiment are labeled with the same reference symbols and detailed description is omitted. Similarly, in the third and subsequent embodiments described below, detailed description is omitted.

The fuel cell 90 includes a plurality of power generation units 91, which each include a first metal separator 92, a first electrolyte membrane-electrode assembly 94a a second metal separator 96, a second electrolyte membrane-electrode assembly 94b, and a third metal separator 98.

Figure 9:
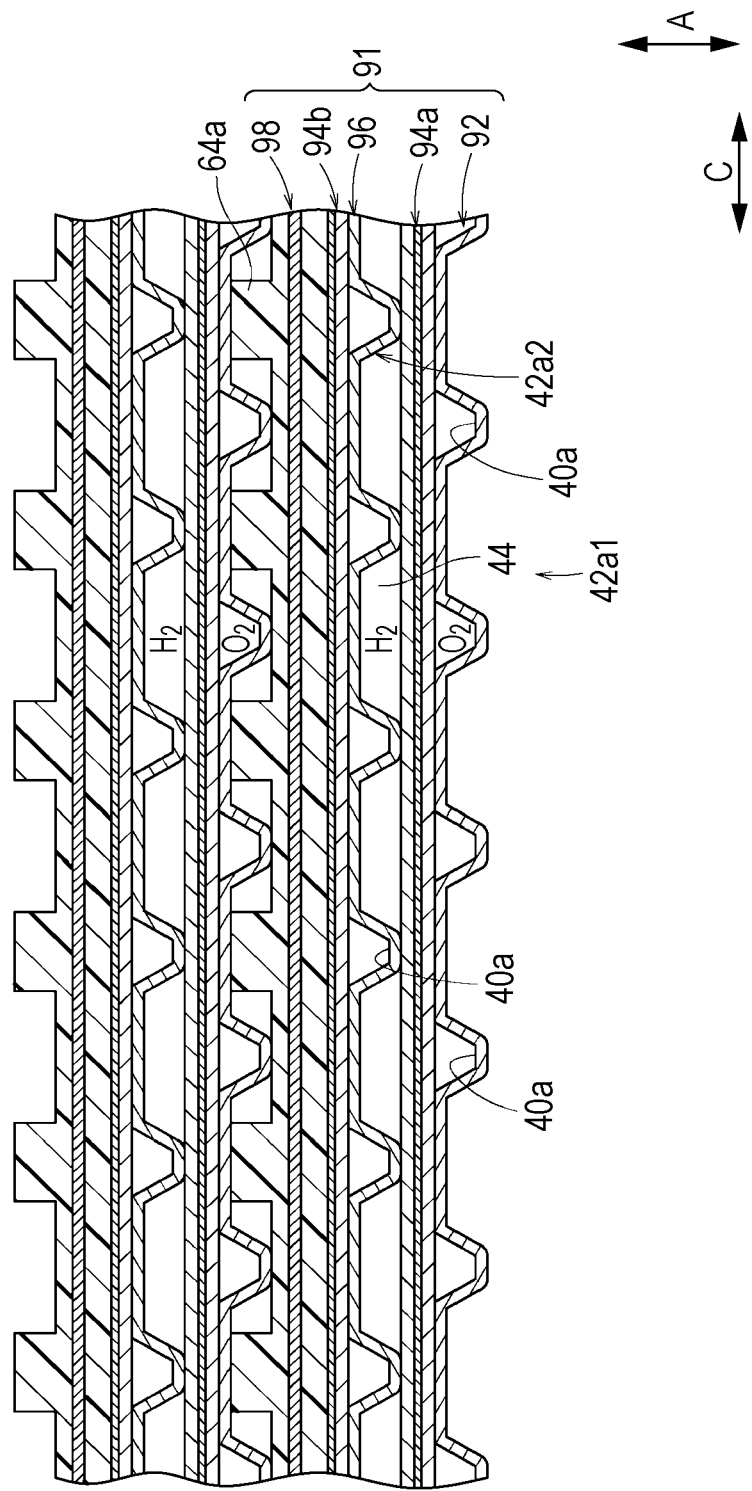
FIG. 9 is an illustrative cross-sectional view of the main part of the fuel cell.

As illustrated in FIGS. 8 and 9, in the first metal separator 92, a single groove group 42a1 is formed so that a plurality of grooves 40a are spaced apart at equal intervals, and a single groove group 42b1 is formed so that a plurality of grooves 40b are spaced apart at equal intervals.

In the second metal separator 96, a single groove group 48a1, 48b1 are formed so that a plurality of grooves 46a, 46b are spaced apart at equal intervals, respectively. In the second metal separator 96, a single groove group 42a2, 42b2 are formed so that a plurality of grooves 40a, 40b are spaced apart at equal intervals, respectively. In the third metal separator 98, a single groove group 48a2, 48b2 are formed so that a plurality of grooves 46a, 46b are spaced apart at equal intervals, respectively.

As illustrated in FIG. 9, the respective grooves 40a, 40a of the groove groups 42a1 and 42a2 are disposed with an offset so as to not overlap when viewed in the stacking direction. Similarly, the respective grooves 40b, 40b of other groove groups 42b1 and 42b2 are disposed with an offset so as to not overlap when viewed in the stacking direction. The groove groups 48a1 and 48a2, and the groove groups 48b1 and 48b2 are formed in a similar manner as described above.

Thus, in the second embodiment, in the respective groove groups 42a1 and 42a2 that constitute unit cells that are adjacent to each other, the respective grooves 40a, 40a are disposed with an offset so as to not overlap when viewed in the stacking direction. Consequently, an advantageous effect is obtained in that sealing surface pressure may be properly secured with an economical and simple configuration.

Figure 10:
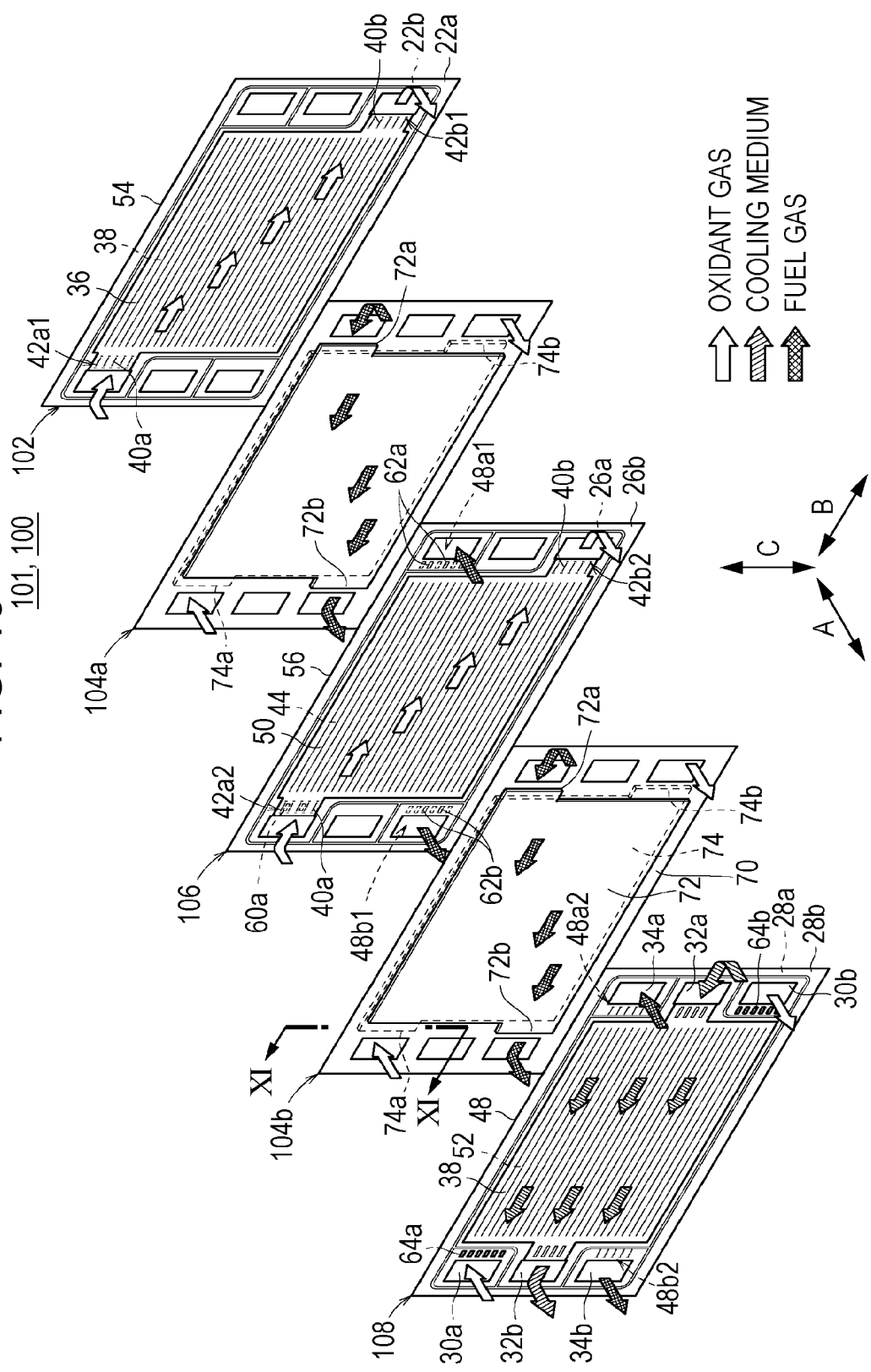
FIG. 10 is an illustrative exploded perspective view of the main part of a fuel cell according to a third embodiment.

FIG. 10 is an illustrative exploded perspective view of the main part of a fuel cell 100 according to a third embodiment.

The fuel cell 100 is formed by stacking a plurality of power generation units 101. The power generation unit 101 includes a first metal separator 102, a first electrolyte membrane-electrode assembly 104a, a second metal separator 106, a second electrolyte membrane-electrode assembly 104b, and a third metal separator 108.

Figure 11:
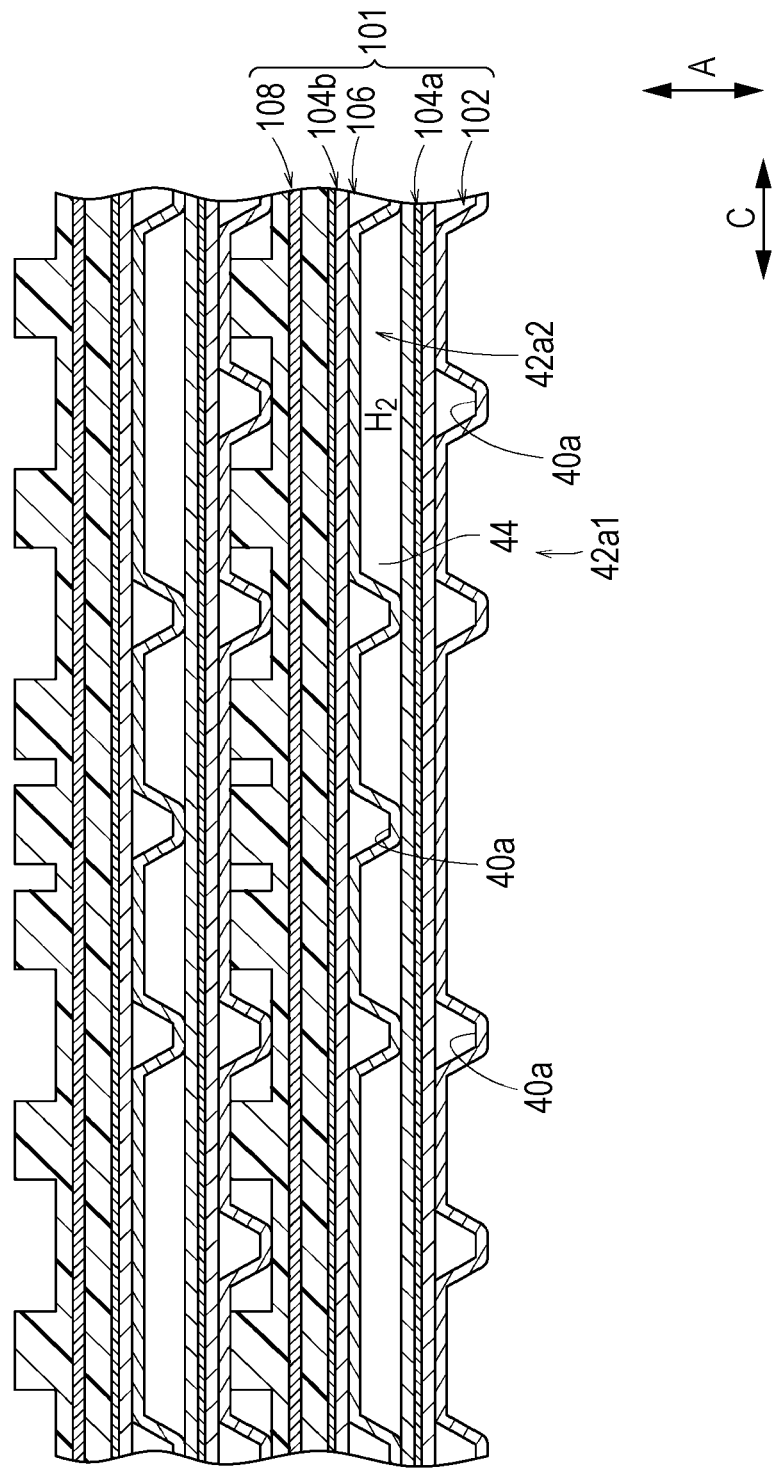
FIG. 11 is an illustrative cross-sectional view of the fuel cell along a line XI-XI in FIG. 10.

As illustrated in FIG. 11, the groove group 42a1 provided in the first metal separator 102 has a plurality of grooves 40a that are spaced apart at equal intervals, and the distance between some adjacent grooves 40a is made larger than the distance between the rest of the adjacent grooves 40a by thinning out predetermined grooves 40a.

The second metal separator 106 includes the groove groups 42a2, and the plurality of grooves 40a that constitute the groove groups 42a2 are spaced apart at equal intervals with predetermined grooves 40a being thinned out. The grooves 40a that constitute the groove groups 42a1, and the grooves 40a that constitute the groove groups 42a2 are disposed so as to overlap with each other in the stacking direction, while thinning-out positions being set to be different in the stacking direction.

Other groove groups 42b1 and 42b2, 48a1 and 48a2, and 48b1 and 48b2 are formed similarly to the above-described groove groups 42a1 and 42a2.

In the third embodiment configured in this manner, for example, the distance between some adjacent grooves 40a is made larger than the distance between the rest of the adjacent grooves 40a by thinning out an arbitrary groove 40a in the groove groups 42a1, 42a2 as illustrated in FIG. 11. Therefore, the flow rate distribution and the pressure loss of the reactant gas may be adjusted with an economical and simple configuration.

Figure 12:
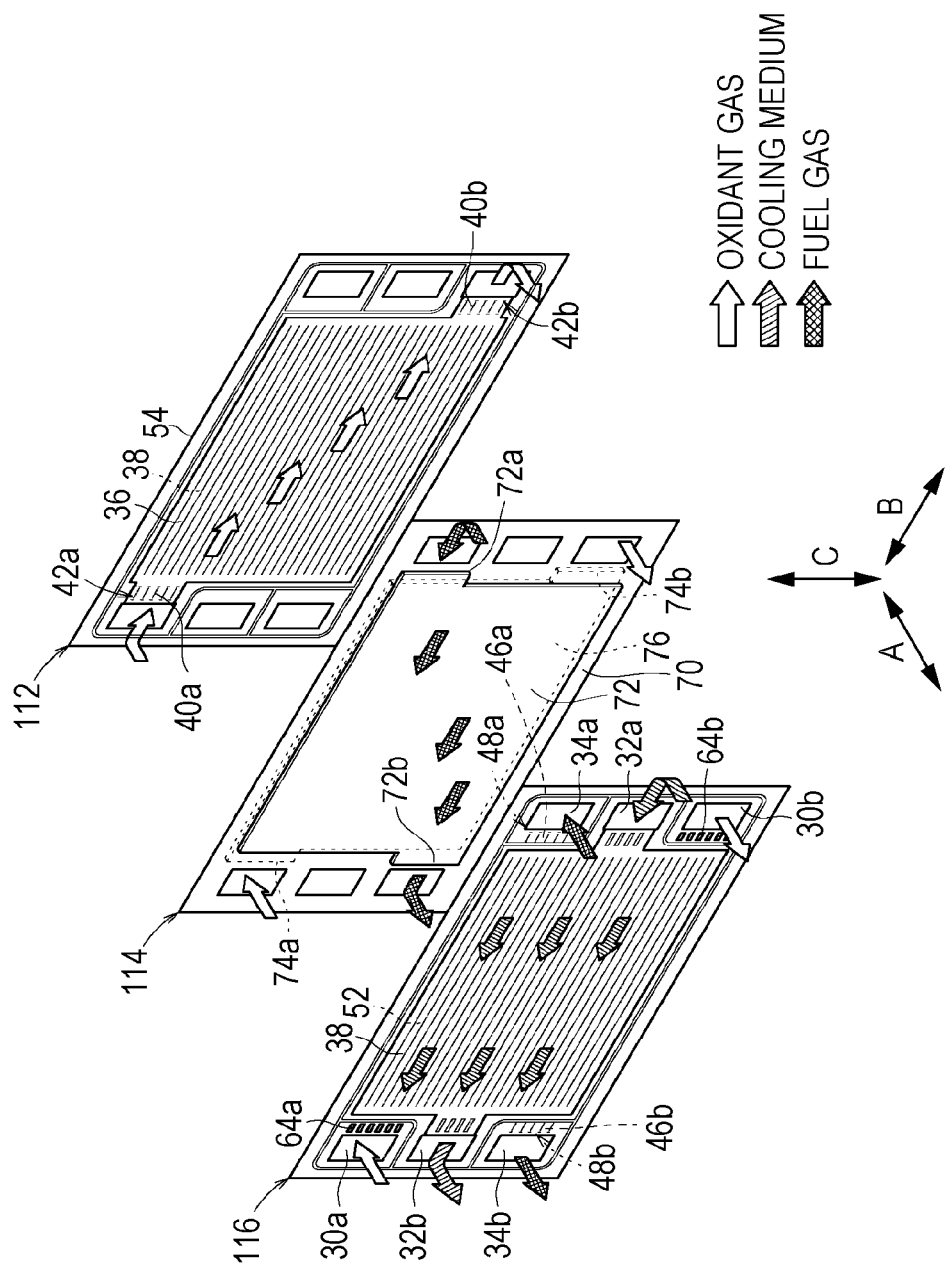
FIG. 12 is an illustrative exploded perspective view of the main part of a fuel cell according to a fourth embodiment.
Figure 13:
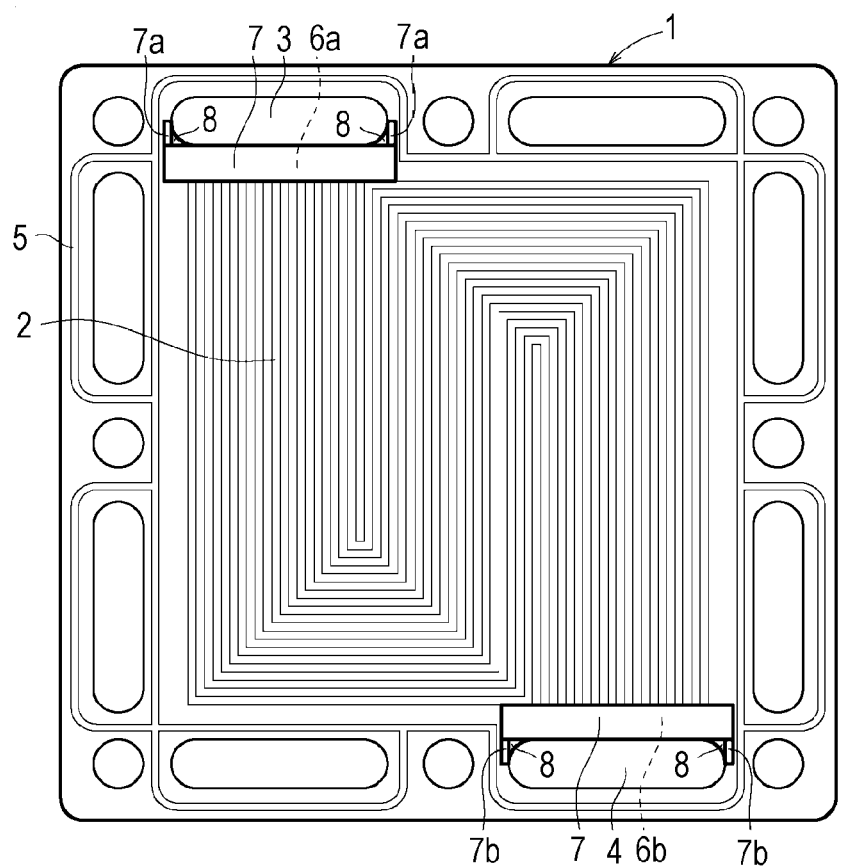
FIG. 13 is an illustrative front view of a separator which constitutes the fuel cell according to Japanese Unexamined Patent Application Publication No. 2001-266911.

FIG. 12 is an illustrative exploded perspective view of the main part of a fuel cell 110 according to a fourth embodiment.

The fuel cell 110 includes a plurality of power generation units (unit cells) 111, and the plurality of power generation units 111 are stacked together. The power generation unit 111 includes a first metal separator 112, an electrolyte membrane-electrode assembly 114, and a second metal separator 116.

The first metal separator 112 is provided with a groove group 42a having a plurality of grooves 40a and a groove group 42b having a plurality of grooves 40b. The second metal separator 116 is provided with a groove group 48a having a plurality of grooves 46a and a groove group 48b having a plurality of grooves 46b.

In the power generation units 111 that are adjacent to each other, grooves 40a, 40a that constitute respective groove groups 42a, 42a are disposed with an offset so as to not overlap when viewed in the stacking direction, and a relatively large distance is provided between adjacent groove groups among a plurality of groove groups 42a (similarly to the first embodiment). In addition, in the fourth embodiment, the above-described second embodiment or third embodiment may also be configured.

A fuel cell according to the embodiment includes a membrane electrode assembly having an electrolyte membrane and a pair of electrodes disposed on both sides of the electrolyte membrane, and a metal separator are stacked together, and a reactant gas passage for supplying a reactant gas along an electrode surface is formed between the membrane electrode assembly and the metal separator, the fuel cell including a reactant gas communication hole that communicates with the reactant gas passage as a through hole in the stacking direction.

In the fuel cell, the metal separator is press-formed to configure a plurality of grooves that allow a reactant gas communication hole to communicate with a reactant gas passage, while the plurality of grooves form a plurality of groove groups, in each of which adjacent grooves are spaced apart by a first distance, and adjacent groove groups are spaced apart by a second distance which is larger than the first distance. Consequently, the flow rate distribution and the pressure loss of the reactant gas between the reactant gas communication hole and the reactant gas passage may be adjusted with an economical and simple configuration.

In addition, a fuel cell according to the embodiment includes a plurality of unit cells, in each of which a membrane electrode assembly and a metal separator are stacked together, and the metal separator is press-formed to configure a plurality of grooves that allow a reactant gas communication hole to communicate with a reactant gas passage, while respective grooves in the unit cells adjacent to each other are disposed with an offset so as to not overlap when viewed in the stacking direction. Consequently, sealing surface pressure may be properly secured with an economical and simple configuration.

In addition, in the fuel cell, a plurality of grooves preferably form a plurality of groove groups, in each of which adjacent grooves are spaced apart by a first distance, and adjacent groove groups are preferably spaced apart by a second distance which is larger than the first distance.

Furthermore, in the fuel cell, the surface of the metal separator on the opposite side to the surface of the metal separator on which the groove groups are formed is preferably provided with receiving members that are each located between adjacent groove groups.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
a membrane electrode assembly having an electrolyte membrane and a pair of electrodes disposed on both sides of the electrolyte membrane;
a metal separator stacked with the membrane electrode assembly, a reactant gas passage being provided between the membrane electrode assembly and the metal separator to supply a reactant gas along an electrode surface, the metal separator including a reactant gas communication hole to communicate with the reactant gas passage, the reactant gas communication hole having a through hole in the stacking direction, the metal separator further including a connecting passage that connects the reactant gas communication hole to the reactant gas passage, the metal separator further including a plurality of groove groups in the connecting passage adjacent to the reactant gas communication hole, the plurality of groove groups each having a plurality of grooves press-formed to provide flow channels that allow the reactant gas communication hole to communicate with the reactant gas passage in a parallel flow arrangement via the flow channels, the grooves adjacent to each other being spaced apart by a first distance, the groove groups adjacent to each other being spaced apart by a second distance larger than the first distance; and a receiving member disposed on a first surface of the metal separator, the first surface being disposed on an opposite side of a second surface of the metal separator, the groove groups being provided on the second surface, the receiving member being located between the groove groups adjacent to each other when viewed in the stacking direction.

2. The fuel cell according to claim 1, wherein
the reactant gas passage extends in a first direction along the electrode surface, and
the grooves extend along the first direction.

3. The fuel cell according to claim 2, wherein
the groove groups are provided between the reactant gas passage and the reactant gas communication hole in the first direction.

4. The fuel cell according to claim 2, wherein
the grooves of each of the groove groups are adjacent to each other in a second direction along the electrode surface, the second direction intersecting with the first direction.

5. A fuel cell comprising:
a plurality of unit cells each comprising:
   a membrane electrode assembly having an electrolyte membrane and a pair of electrodes disposed on both sides of the electrolyte membrane; and
   a metal separator stacked with the membrane electrode assembly, a reactant gas passage being provided between the membrane electrode assembly and the metal separator to supply a reactant gas along an electrode surface, the metal separator including a reactant gas communication hole to communicate with the reactant gas passage, the reactant gas communication hole having a through hole in the stacking direction, the metal separator further including a connecting passage that connects the reactant gas communication hole to the reactant gas passage, the metal separator further including a plurality of grooves in the connecting passage adjacent to the reactant gas communication hole, the plurality of grooves each press-formed to provide flow channels that allow the reactant gas communication hole to communicate with the reactant gas passage in a parallel flow arrangement via the flow channels; and
the grooves provided in a first unit cell being offset not to overlap with the grooves provided in a second unit cell when viewed in the stacking direction, the first unit cell being adjacent to the second unit cell.

6. The fuel cell according to claim 5, wherein
the grooves are included in a plurality of groove groups,
the grooves adjacent to each other are spaced apart by a first distance, and
the groove groups adjacent to each other are spaced apart by a second distance larger than the first distance.

7. The fuel cell according to claim 5, further comprising:
a receiving member disposed on a first surface of the metal separator, the first surface being disposed on an opposite side of a second surface of the metal separator, the groove groups being provided on the second surface, the receiving member being located between the groove groups adjacent to each other when viewed in the stacking direction.

8. The fuel cell according to claim 5, wherein
the reactant gas passage extends in a first direction along the electrode surface, and
the grooves extend along the first direction.

9. The fuel cell according to claim 8, wherein
the grooves are provided between the reactant gas passage and the reactant gas communication hole in the first direction.

10. The fuel cell according to claim 8, wherein
the grooves are adjacent to each other in a second direction along the electrode surface, the second direction intersecting with the first direction.

* * * * *